(12) United States Patent
Taurel et al.

(10) Patent No.: US 6,948,511 B2
(45) Date of Patent: Sep. 27, 2005

(54) FUEL TANK AND A METHOD OF MANUFACTURING IT

(75) Inventors: Jean-Luc Taurel, Landres (FR); Eric Firtion, Villers sur Coudun (FR)

(73) Assignee: Inergy Automotive Systems Research, Brussels (BE)

( * ) Notice: Subject to any disclaimer, the term of this patent is extended or adjusted under 35 U.S.C. 154(b) by 175 days.

(21) Appl. No.: 09/843,809

(22) Filed: Apr. 30, 2001

(65) Prior Publication Data

US 2002/0011271 A1 Jan. 31, 2002

(30) Foreign Application Priority Data

May 3, 2000 (FR) .............................................. 00 05638

(51) Int. Cl.[7] .............................................. E03B 11/00
(52) U.S. Cl. ............... 137/15.01; 137/549; 137/565.34; 137/573; 137/574; 123/509; 417/363
(58) Field of Search ...................... 123/509; 417/363; 137/565.24, 573, 574, 549, 565.34, 15.01

(56) References Cited

U.S. PATENT DOCUMENTS

| | | | |
|---|---|---|---|
| 4,306,844 A | | 12/1981 | Otto et al. |
| 5,129,544 A | | 7/1992 | Jacobson et al. |
| 5,186,200 A | * | 2/1993 | Kimura et al. ................. 137/15 |
| 5,394,902 A | * | 3/1995 | Shibao ........................ 137/565 |
| 5,758,627 A | * | 6/1998 | Minagawa et al. ......... 123/509 |
| 5,850,933 A | * | 12/1998 | Pazik ......................... 220/563 |
| 5,951,050 A | | 9/1999 | Siekmann |
| 6,216,734 B1 | * | 4/2001 | Umetsu et al. ........ 137/565.24 |

FOREIGN PATENT DOCUMENTS

| | | |
|---|---|---|
| EP | 0 571 876 A1 | 12/1993 |
| EP | 0 799 990 A2 | 10/1997 |
| EP | 0 864 458 A1 | 9/1998 |
| EP | 0 875 411 A2 | 11/1998 |
| EP | 0 930 189 A2 | 7/1999 |
| EP | 1 002 682 A2 | 5/2000 |
| FR | 2 460 196 A | 1/1981 |
| JP | 61-220929 | 3/1985 |
| WO | WO 99/42316 | 8/1999 |
| WO | WO 99/42319 | 8/1999 |

* cited by examiner

*Primary Examiner*—A. Michael Chambers
(74) *Attorney, Agent, or Firm*—Oliff & Berridge, PLC

(57) ABSTRACT

A fuel tank comprises a shell made by assembling together at least two tank portions each made by molding a thermoplastic material and, when assembled together, defining the inside surface of the tank. The tank has a fuel pump fixed to its inside surface before the tank portions are assembled together.

31 Claims, 4 Drawing Sheets

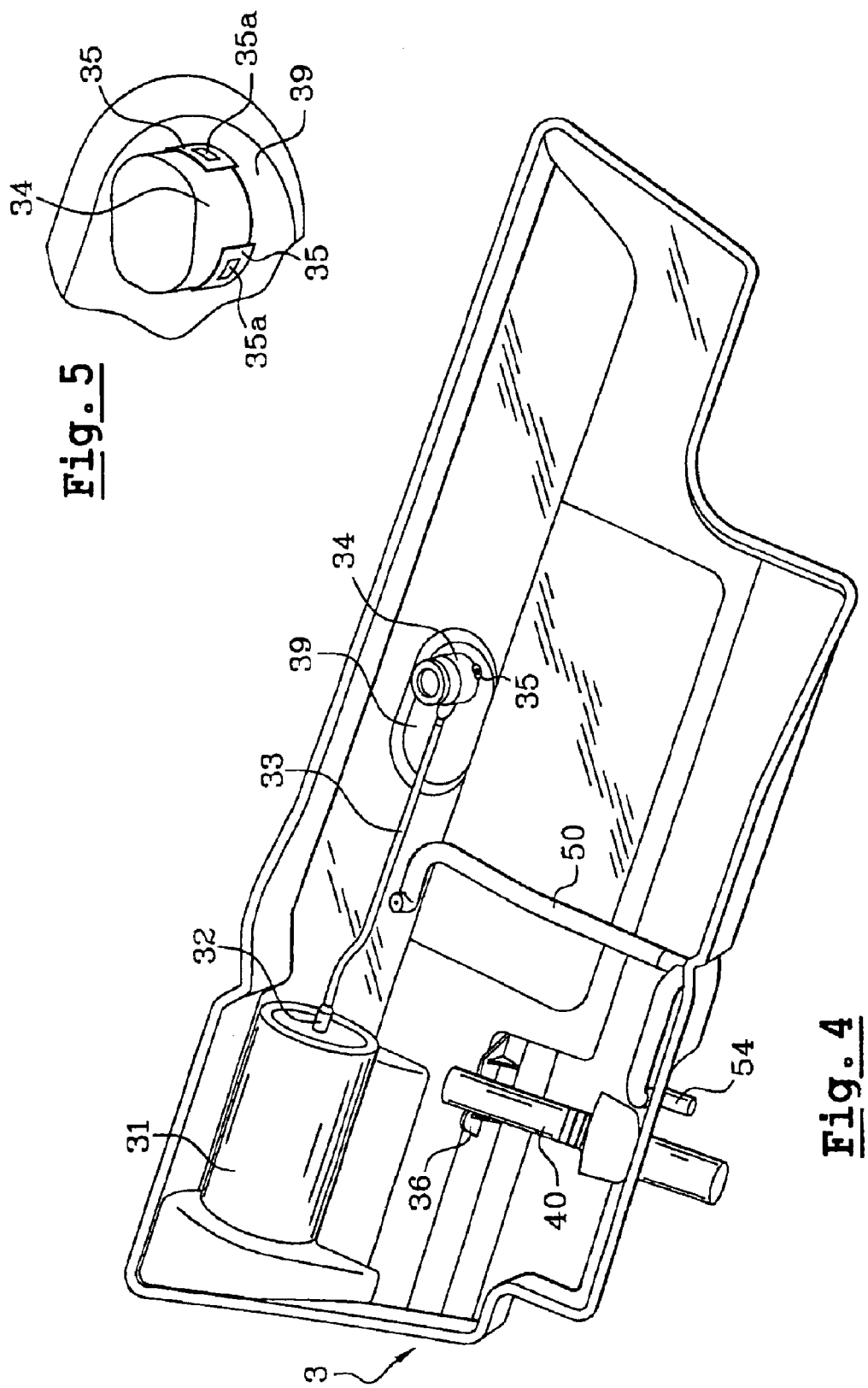

FUEL TANK AND A METHOD OF MANUFACTURING IT

The present invention relates to a fuel tank, in particular for a motor vehicle.

BACKGROUND OF THE INVENTION

It is known that the shell of a fuel tank can be made by blowing a parison of thermoplastic material.

Such a manufacturing method presents the advantage of enabling a fuel tank shell to be made as a single piece.

Nevertheless, such a method does not make it easy to form portions in relief, such as ribs or setbacks, in the inside surface of the tank.

Furthermore, access to the inside of such a tank is restricted by the size of the openings that are made through the shell.

Consequently, it is quite difficult to position accessories properly inside the tank, e.g. the components of a suction assembly, for example.

Application EP-A-0 571 876 discloses a fuel tank comprising two portions united via their peripheries on either side of a support having various accessories mounted thereon for placing inside the tank.

The use of such a support makes it possible to avoid making large openings through the wall of the tank, but it makes the tank more complex to assemble.

Finally, there exists a need to minimize hydrocarbon emissions through the shell of the tank, for environmental and regulatory reasons.

OBJECTS AND SUMMARY OF THE INVENTION

The invention seeks in particular to provide a tank that satisfies regulations concerning hydrocarbon emissions, which is easy to assemble, while offering a wide range of options concerning how accessories are positioned inside the tank.

The invention achieves this by means of a novel fuel tank comprising a shell formed by assembling together at least two tank portions made by molding a plastics material and, when assembled together, defining the inside surface of the tank, said tank including a fuel pump fixed to its inside surface prior to the tank portions being assembled together.

By means of the invention, it is easy to make ribs or housings in the inside surface of the tank by using a mold of appropriate shape.

Furthermore, it is easy to position the fuel pump and/or various other fittings of a filling system at selected locations so as to improve the performance of the tank.

Fixing fittings directly to the inside surface of the tank tends to simplify manufacture, to reduce the number of parts, to improve reliability, to lower costs, and to limit hydrocarbon emissions by reducing the openings or holes that need to be made through the shell.

In particular, the shell of the tank may have no through orifice for use in inserting a fitting inside the tank, and in particular no through orifice of section greater than that of the body of the fuel pump and situated in register with the fuel pump, for example.

The fuel tank can have at least one fitting such as a fuel gauge which is fixed to the inside surface of the tank and which is separate from the fuel pump.

In a particular embodiment, the two portions of the tank are made by injection molding a thermoplastic material.

Still in a particular embodiment, at least one of the portions of the tank has fixing means for receiving a fitting inside the tank, said fixing means being formed integrally with said portion of the tank.

This avoids the need to make holes through the shell of the tank to enable the fixing means to be installed, where such holes give rise to problems of leakproofing and contribute to increasing hydrocarbon emissions.

In a particular embodiment, the above-mentioned fixing means comprise at least one wall projecting into the inside of the tank. In another particular embodiment, said wall has at least one recess enabling a fixing member of a fitting to be received.

Still in a particular embodiment, the wall in question has at least one tooth for snap-fastening in a recess of a fitting.

Advantageously, at least one of the portions of the tank has a housing enabling a fitting to be fixed on the outside of the tank, said housing being defined by a wall integrally molded with the corresponding portion of the tank.

In a particular embodiment, said fitting is a filter for trapping fuel vapor, sometimes referred to as a "canister".

Fixing a canister on the outside of the tank gives easy access to said fitting, thus facilitating possible replacement thereof.

It also makes it possible to avoid using external pipes between the canister and the tank.

In a preferred embodiment, one of the portions of the tank has a compartment placed at a low point of the tank and said compartment includes a filler tube whose end through which the fuel leaves is positioned in such a manner that, during filling, the fuel falls into said compartment.

The shape of the compartment is advantageously selected in such a manner as to enable it to co-operate with a small quantity of fuel to constitute a reserve of sufficient depth to be able to prime the fuel pump situated in said compartment and having its suction inlet opening out into the bottom of the compartment in question.

This makes it possible to provide a tank which makes it possible to start running again after running out of fuel without any need to pour a large quantity of fuel into the tank.

Advantageously, the compartment in question is formed integrally by being molded out of the same material as the corresponding portion of the tank.

Preferably, the pump is supported by support means that serve to avoid transmitting vibration from the pump to the tank.

By way of example, the support means include a central portion arranged to receive the pump and fins for holding said central portion and arranged to be fixed to the wall defining the above-mentioned compartment.

Making the above-mentioned compartment directly with the corresponding portion of the tank and fixing the pump in said compartment enable problems of tank deformation due to plastics material creeping in the long term, for example, to be avoided since the compartment and the pump can track any deformations of the tank wall.

In prior tanks, in which the pump is secured to a suction assembly fixed to the top wall of the pump shell, a spring compensation system is provided to keep the pump pressed against the bottom wall of the shell in the event of the shell deforming.

By means of the invention, such a spring compensation system becomes pointless.

In a preferred embodiment, one of the portions of the tank forms substantially the bottom half while the other portion forms substantially the top half.

Advantageously, the bottom portion has a housing defined by a wall that is integrally molded out of the same material, said housing being for receiving a fuel filter.

Still advantageously, the top portion has a housing defined by a wall integrally formed by molding the same material, said housing being designed to receive a canister.

In a particular embodiment, the inside surface of the tank includes substantially vertical ribs.

These ribs contribute to improving the mechanical strength of the tank and they tend to limit the amplitude of waves in the fuel when the vehicle is moving.

At least one rib preferably has a passage passing through the base thereof to allow fuel to flow inside the tank in such a manner as to enable the tank to be emptied completely.

The tank can include a fuel gauge fixed to its inside surface.

The tank can also include a pressure regulator fixed to its inside surface, close to its low point.

The fuel taken by the pump and not delivered to the engine can then be returned to the tank via such a pressure regulator.

Still in a particular embodiment, the two portions of the tank are assembled together by heat-sealing.

In a variant, the portions of the tank are assembled together by adhesive.

The invention also provides a fuel tank having a shell made by assembling together at least two tank portions each made by molding a plastics material and defining, when assembled together, the inside surface of the tank, said tank including a compartment placed at a low point of the tank and one of the tank portions has a filler tube whose end through which the fuel leaves is positioned in such a manner that, during filling, the fuel falls into said compartment.

The invention also provides a method of manufacturing a fuel tank, the method comprising the following steps:

a) making a least two tank portions out of plastics material by molding;

b) fixing a fuel pump to the inside surface of one of the tank portions; and c) assembling the tank portions together.

This method of manufacture gives a large degree of freedom in positioning the fittings that are fixed to the inside of the tank since they are mounted before the portions of the tank are assembled together.

The portions of the tank are preferably made by injection molding a thermoplastic material.

Advantageously, between step a) and step b) of the above-defined method, the tank portions are treated so as to give them resistance to hydrocarbons.

This treatment is performed on the tank portions before they are assembled together, making it easier to perform the treatment.

It is possible to fix the following to the inside surface of the bottom portion of the tank:

the fuel pump;

a pressure regulator; and a fuel gauge.

It is also possible to fix a canister in a housing that opens out to the outside of the top portion of the tank.

The inside surface of the bottom portion of the tank can have the following fixed thereto:

a check valve;

a filler tube; and a degassing duct.

It is also possible to fix a fuel filter in a housing that opens out to the outside of the bottom portion of the tank.

BRIEF DESCRIPTION OF THE DRAWINGS

In order to make the invention better understood, there follows a description of an embodiment given by way of non-limiting example and made with reference to the accompanying drawings, in which:

FIG. 4 is a diagrammatic view from beneath of the top portion of the FIG. 1 tank; and FIG. 5 is a diagram showing a detail of FIG. 4.

MORE DETAILED DESCRIPTION

Figure 1:
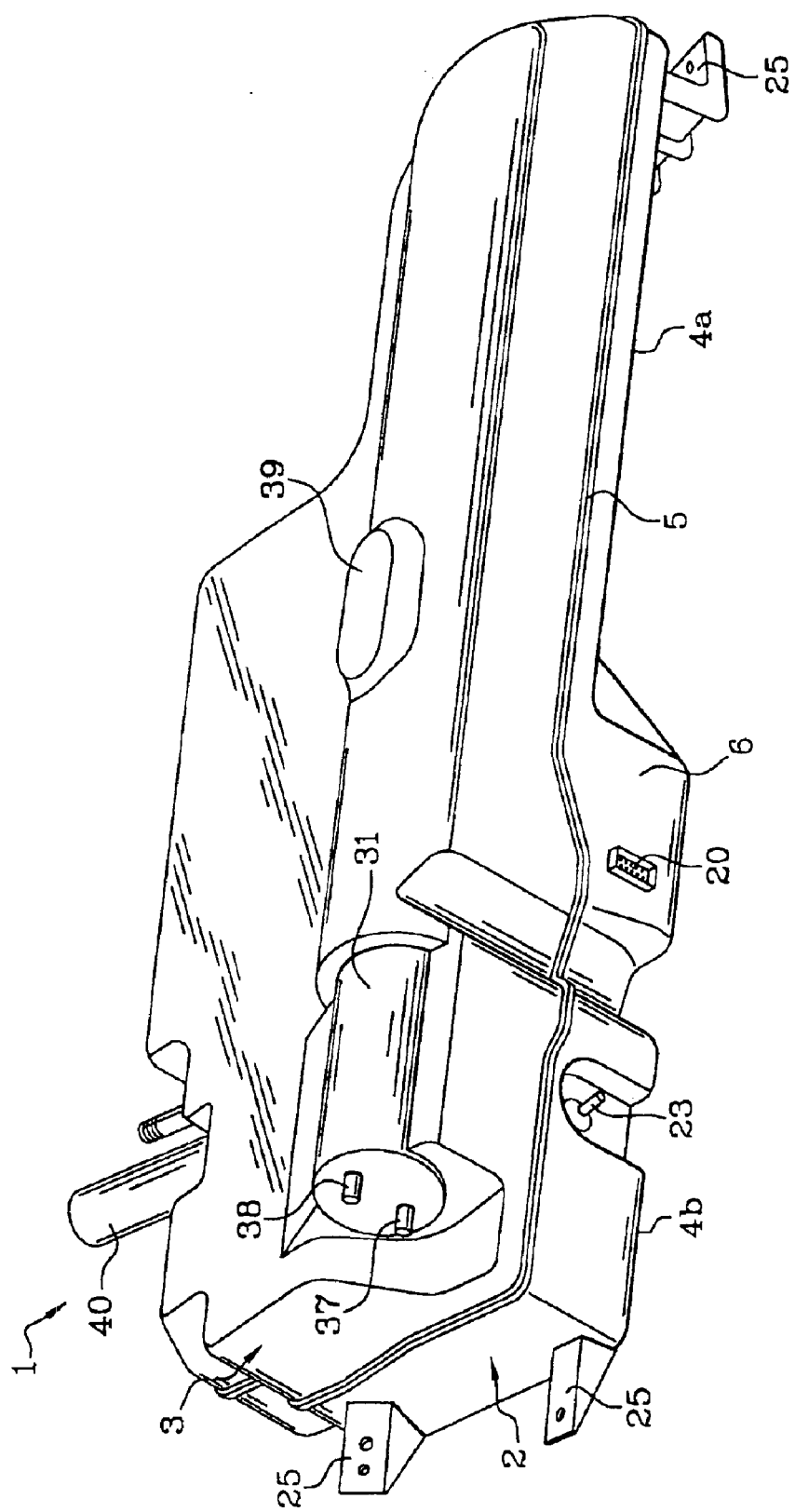
FIG. 1 is a diagrammatic perspective view of a tank constituting an embodiment of the invention.

FIG. 1 shows a motor vehicle fuel tank 1 comprising a bottom portion 2 and a top portion 3 that are assembled together by heat-sealing along an assembly line 5.

The two portions 2 and 3 are made of thermoplastic material by injection molding.

The inside surface of each of the portions 2 and 3 is subjected to treatment for providing a barrier against hydrocarbons, e.g. a fluoridation treatment.

Figure 2:
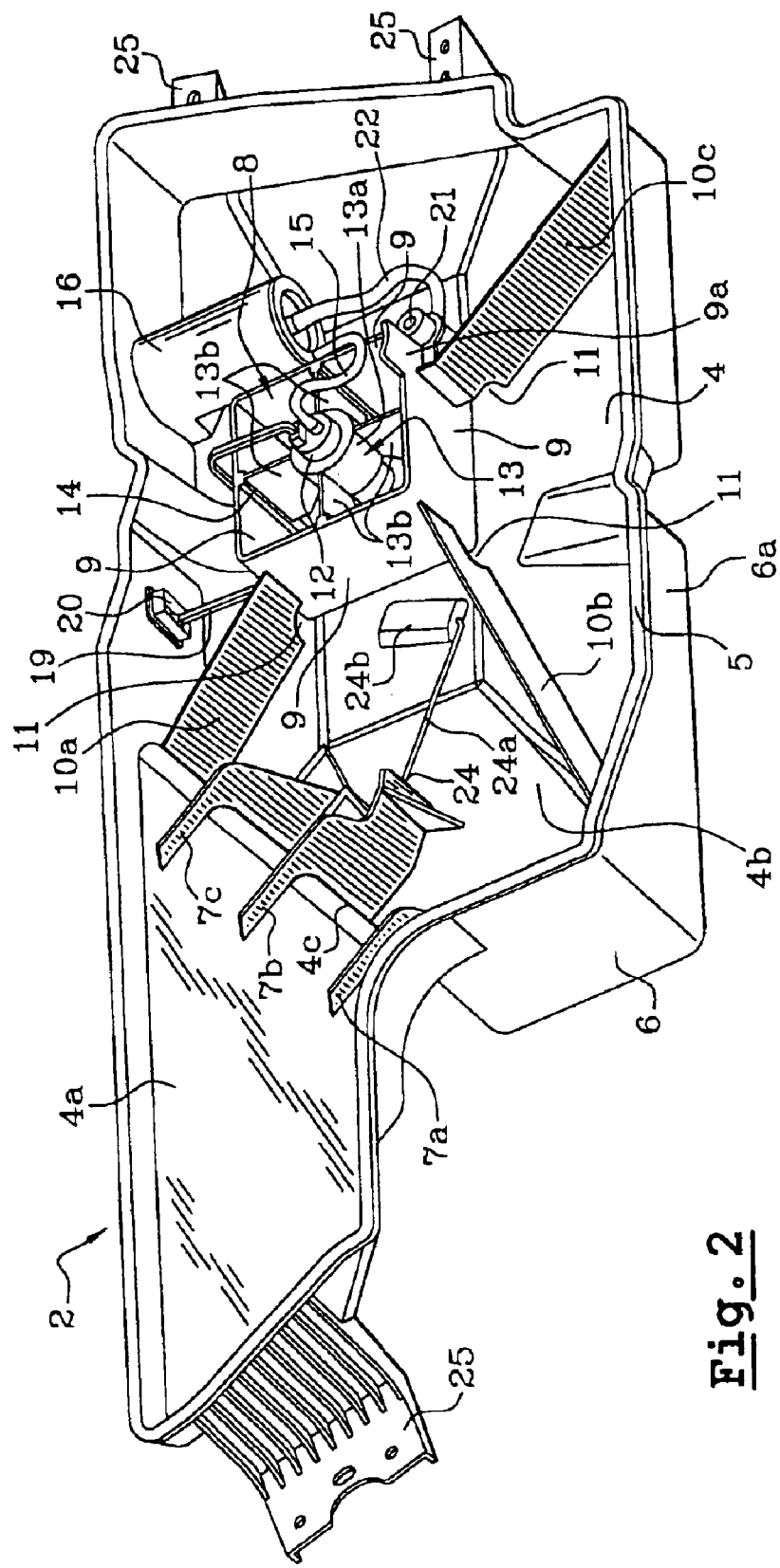
FIG. 2 is a diagrammatic view of the inside of the bottom portion of the FIG. 1 tank.

As can be seen in FIGS. 1 and 2, the bottom portion 2 has a stepped bottom wall 4, with a high portion 4a and a low portion 4b.

The low and high portions 4b and 4a are interconnected by a substantially vertical riser 4c from which vertical stiffening ribs 7a, 7b, and 7c project.

The bottom portion 2 has a compartment 8 generally in the shape of a rectangular parallelepiped substantially in the center of the bottom portion 4b, the compartment being formed by four vertical partitions 9 integrally formed with the bottom wall 4.

Vertical ribs 10a, 10b, and 10c integrally formed with the bottom wall 4 project from the bottom portion 4b.

The rib 10a extends between the riser 4c and an edge of the compartment 8.

The ribs 10b and 10c extend between one side 6a of the side wall 6 of the bottom portion 2 and a partition 9.

Where they join the compartment 8 and at the bottoms thereof, the ribs 10a, 10b, and 10c have through openings 11 which allow fuel to circulate around the compartment 8.

The location of the compartment 8 corresponds substantially to the low point of the tank.

A fuel pump 12 is located inside the compartment 8.

This fuel pump 12 is fixed in the compartment 8 by means of a fixing member 13 which has a central portion 13a of tubular shape, which receives the fuel pump 12, and four radial fins 13b having ribs at their ends, these ribs being arranged to be inserted vertically in slideways 14 formed in the inside faces of the partitions 9.

The fixing member 13 is made of a material having good properties for absorbing mechanical vibration, thereby reducing the operating noise of the pump and making it more difficult for operating vibration of the pump 12 to be transmitted to the bottom wall 4.

The fuel pump 12 has a suction inlet for taking in fuel through a strainer located in the bottom of the compartment 8.

The fuel pump 12 is connected to the electrical power supply of the vehicle by means of an electric cable 19 and an electric connector 20 fixed in leakproof manner in an opening through the side wall 6 of the tank.

The outlet from the fuel pump 12 is connected by a tube 15 to a fuel filter that is fixed from the outside of the tank in a housing 16 that is integrally formed with the side wall 6 of the bottom portion 2 as part of the same plastics material molding.

The tank 1 also has a pressure regulator 21 fixed on the bottom portion 4b close to the compartment 8.

This pressure regulator 21 is connected to the fuel filter contained in the housing 16 by means of a tube 22.

The above-mentioned fuel filter has an endpiece 23 that can be seen in FIG. 1, for connection via a duct (not shown) to the vehicle engine.

Fuel which is not consumed by the engine and which has been sucked in by the pump 12 and sent through the fuel filter is returned to the tank via the tube 22 and it leaves the pressure regulator 21 close to the compartment 8 so that when only a small quantity of fuel remains in the tank, the fuel that is returned via the pressure regulator 21 can quickly be sucked back up by the pump 12.

The tank 1 also has a fuel gauge 24 fixed to the rib 7b, said gauge being connected to an electrical connector 20 and having a hinge arm 24a provided at its end with a float 24b.

One of the partitions 9 defining the compartment 8 has a vertical extension 9a whose top edge is upwardly concave to serve as a support for the end of a filler tube 40, as described in greater detail below with reference to FIG. 3.

The bottom portion 2 has external tabs 25 enabling the tank 1 to be fixed to the vehicle.

FIG. 4 shows the top portion 3.

The top portion 3 is shaped to receive the above-mentioned filler tube 40.

This filler tube 40 passes through the side wall of the top portion 3.

A housing 31 is integrally molded with the top portion 3 in order to receive a canister.

The housing 31 is open to the outside of the tank to enable the canister to be put into place from the outside, and optionally to enable it to be replaced.

The housing 31 communicates with the inside of the tank via an endpiece 32 that is integrally formed with the top portion 3 while it is being molded.

The endpiece 32 is connected by a tube 33 to a check valve 34 fixed by snap-fastening in a setback 39 situated substantially at the high point of the tank.

Tabs 35 having recesses 35a in which the teeth of the valve 34 can engage are disposed in the setback 39, as can be seen in FIG. 5.

The canister placed in the housing 31 communicates with the outside via two endpieces 37 and 38 that can be seen in FIG. 1, one of which communicates with ambient air and the other of which communicates with a purge system enabling the activated carbon contained in the canister to be reactivated.

The bottom end 42 of the filler tube 40 is positioned (when the top and bottom portions 2 and 3 of the tank are assembled together), in such a manner that fuel falls into the compartment 8.

This configuration makes it possible to begin by filling the compartment 8 which is advantageous when only a small amount of fuel is available for filling the tank.

Filling the compartment 8 with only a few liters of fuel suffices to prime the fuel pump 12.

The top portion 3 has a rib 36 whose bottom edge is downwardly concave, said rib 36 being arranged in such a manner as to be positioned so as to be slightly offset above the above-mentioned extension 9a, thereby holding the tube 40 against the extension 9a once the tank 1 has been assembled.

Figure 3:
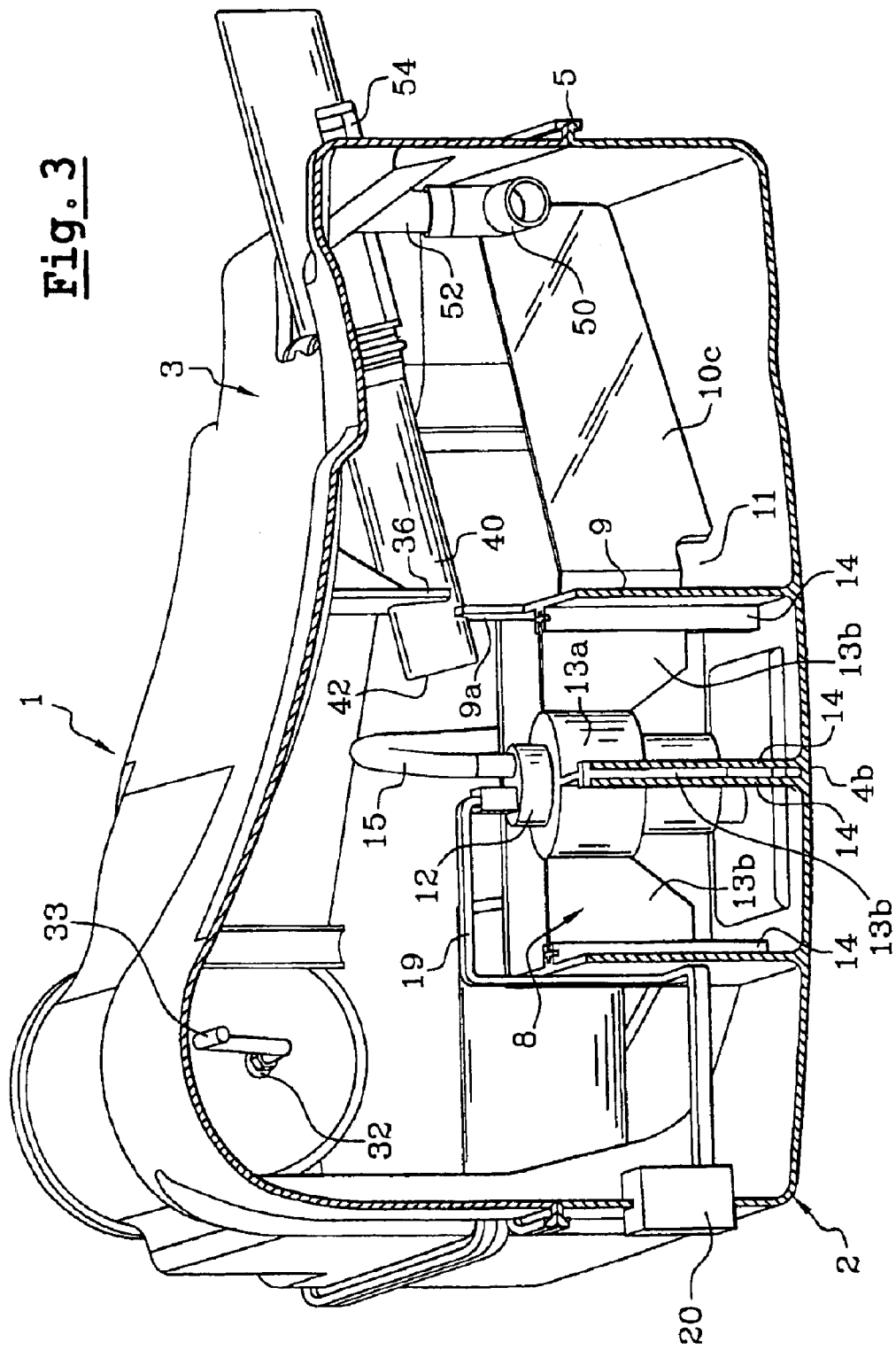
FIG. 3 is a diagrammatic view of half of the FIG. 1 tank, seen in section on a vertical plane.

A degassing duct 50 operating when the filler nozzle is triggered is fixed in the top portion 3, opening out at an end 51 close to the high point of the tank and connected at its other end to an endpiece 52, as can be seen in FIGS. 3 and 4.

The endpiece 52 is integrally formed with the top portion 3 during molding thereof, and it communicates with an external endpiece 54.

Furthermore, in the example described, the valve 34 is arranged to perform the following functions:
close access to the tube 33 in the event of the vehicle rolling over;
creating significant head loss beyond a predetermined level of fuel inside the tank so as to prevent the tank being overfilled; and
prevent splashes of liquid fuel reaching the canister.

Naturally, the above-described example is not limiting in nature and any desirable modification can be made thereto without going beyond the ambit of the invention.

Thus, the locations of the various fittings on the bottom and top portions of the tank could be modified.

It is also possible to modify the shape of said portions.

What is claimed is:

1. A method of manufacturing a fuel tank, the method comprising the following steps:
    a) making at least an upper and lower tank portion out of plastic material by molding, the lower tank portion comprising a compartment, the compartment being monolithic with the lower tank portion;
    b) fixing a fuel pump into the monolithic compartment, the fuel pump including a fuel pump housing; and
    c) assembling at least the upper and lower tank portions together in order to form an exterior shell, said fuel pump and fuel pump housing being located entirely within the shell,
    wherein the monolithic compartment is placed at a low point of the tank, the upper tank portion includes a filler tube having an end positioned in such a manner that, during filling, the fuel drops from the filler tube into the monolithically molded compartment.

2. A method according to claim 1, wherein the two tank portions are made by injection molding a thermoplastic material.

3. A fuel tank comprising:
    an exterior shell formed by at least an upper and lower tank portion assembled together, and made of molded plastics material, the lower tank portion comprising a compartment, the compartment being monolithically molded with the lower tank portion, and
    a fuel pump including a fuel pump housing, the fuel pump and fuel pump housing located entirely within the shell and fixed into the monolithically molded compartment, wherein the monolithically molded compartment is placed at a low point of the tank, the upper tank portion includes a filler tube having an end positioned in such a manner that, during filling, the fuel drops from the filler tube into the monolithically molded compartment.

4. A tank according to claim 3, wherein the shell of the tank has no through orifice suitable for enabling a fitting to be inserted into the inside of the tank.

5. A tank according to claim 3, in which the fuel pump has a body, wherein the shell of the tank has no through orifice of section greater than the section of the fuel pump body.

6. A tank according to claim 3, wherein the fuel tank has no through orifice in register with the fuel pump.

7. A tank according to claim 3, including at least one fitting such as a fuel gauge fixed to the inside surface of the tank and separate from said fuel pump.

8. A tank according to claim 3, wherein the compartment is placed at a low point of the tank, wherein one of the tank portions includes a filler tube having an end through which the fuel leaves positioned in such a manner that, during filling, the fuel drops in the compartment.

9. A tank according to claim 3, including support means for supporting the pump and to avoid transmitting vibration from the pump to the tank.

10. A tank according to claim 3, wherein the two tank portions are made by injection molding a thermoplastic material.

11. A tank according to claim 3, wherein at least one of the tank portions has fixing means for enabling a fitting to be fixed inside the tank, said fixing means being integrally molded out of the same material as said at least one tank portion.

12. A tank according to claim 3, wherein a bottom portion of the tank includes a housing defined by a wall integrally molded out of the same material as said bottom portion, and configured for receiving a fuel filter.

13. A tank according to claim 3, wherein a top portion of the tank includes a housing defined by a wall integrally molded out of the same material as said top portion, for receiving a canister.

14. A tank according to claim 3, wherein the tank portions are assembled together by at least one of adhesive or by heat-sealing.

15. The fuel tank of claim 3, wherein the shape of the monolithically molded compartment is configured such that, when a remainder of the tank is empty, an amount of fuel may remain within the monolithically molded compartment sufficient to prime the fuel pump.

16. A fuel tank comprising:
an exterior shell formed by at least an upper and lower tank portion assembled together, and made of molded plastics material, the lower tank portion comprising a compartment, the compartment being monolithically molded with the lower tank portion,
a fuel pump including a fuel pump housing, the fuel pump and fuel pump housing located entirely within the shell and fixed into the monolithically molded compartment, and
a central portion configured to receive the pump, and fins attached to the central portion and configured to be fixed to a wall of said compartment,
wherein the monolithically molded compartment is placed at a low point of the tank, the upper tank portion includes a filler tube having an end positioned in such a manner that, during filling, the fuel drops from the filler tube into the monolithically molded compartment.

17. A tank according to claim 16, wherein the shell of the tank has no through orifice suitable for enabling a fitting to be inserted into the inside of the tank.

18. A tank according to claim 16, in which the fuel pump has a body, wherein the shell of the tank has no through orifice of section greater than the section of the fuel pump body.

19. A tank according to claim 16, wherein the fuel tank has no through orifice in register with the fuel pump.

20. A tank according to claim 16, including at least one fitting such as a fuel gauge fixed to the inside surface of the tank and separate from said fuel pump.

21. A tank according to claim 16, including support means for supporting the pump and to avoid transmitting vibration from the pump to the tank.

22. A tank according to claim 16, wherein at least one of the tank portions has fixing means for enabling a fitting to be fixed inside the tank, said fixing means being integrally molded out of the same material as said at least one tank portion.

23. A tank according to claim 16, wherein one of the tank portions substantially forms a bottom half while the other substantially forms a top half.

24. A tank according to claim 16, wherein a bottom portion of the tank includes a housing defined by a wall integrally molded out of the same material as said bottom portion, and configured for receiving a fuel filter.

25. A tank according to claim 16, wherein a top portion of the tank includes a housing defined by a wall integrally molded out of the same material as said top portion, for receiving a canister.

26. A tank according to claim 16, wherein an inside surface of the tank includes substantially vertical ribs.

27. A tank according to claim 16, wherein at least one rib has a passage passing through its base to allow fuel to flow therethrough.

28. A tank according to claim 16, including a fuel gauge fixed to an inside surface of the tank.

29. A tank according to claim 16, including a pressure regulator fixed to the inside surface of the tank close to a low point.

30. A tank according to claim 16, wherein the tank portions are assembled together by at least one of adhesive or by heat-sealing.

31. The fuel tank of claim 16, wherein the shape of the monolithically molded compartment is configured such that, when a remainder of the tank is empty, an amount of fuel may remain within the monolithically molded compartment sufficient to prime the fuel pump.

* * * * *